United States Patent
Wartmann

(10) Patent No.: US 8,724,227 B2
(45) Date of Patent: May 13, 2014

(54) HIGH-APERTURE IMMERSION OBJECTIVE

(75) Inventor: Rolf Wartmann, Waake (DE)

(73) Assignee: Carl Zeiss Microscopy GmbH, Jena (DE)

( * ) Notice: Subject to any disclaimer, the term of this patent is extended or adjusted under 35 U.S.C. 154(b) by 38 days.

(21) Appl. No.: 13/634,957

(22) PCT Filed: Feb. 25, 2011

(86) PCT No.: PCT/EP2011/000931
§ 371 (c)(1),
(2), (4) Date: Sep. 14, 2012

(87) PCT Pub. No.: WO2011/124300
PCT Pub. Date: Oct. 13, 2011

(65) Prior Publication Data
US 2013/0003187 A1    Jan. 3, 2013

(30) Foreign Application Priority Data

Apr. 10, 2010  (DE) ......................... 10 2010 014 502

(51) Int. Cl.
*G02B 21/02* (2006.01)
*G02B 9/14* (2006.01)

(52) U.S. Cl.
USPC ........... 359/656; 359/657; 359/658; 359/659; 359/660; 359/661; 359/787

(58) Field of Classification Search
USPC .................. 359/656–661, 716, 784, 786, 787
See application file for complete search history.

(56) References Cited

U.S. PATENT DOCUMENTS

| 5,502,596 | A | * | 3/1996 | Suzuki ......................... 359/657 |
| 5,532,878 | A | * | 7/1996 | Suenaga et al. ............... 359/657 |
| 5,805,346 | A | * | 9/1998 | Tomimatsu ................... 359/656 |
| 5,982,559 | A | | 11/1999 | Kurutake |
| 6,501,603 | B2 | | 12/2002 | Kasahara |
| 6,504,653 | B2 | | 1/2003 | Matthae et al. |
| 6,519,092 | B2 | * | 2/2003 | Yamaguchi ................... 359/656 |
| 7,199,938 | B2 | * | 4/2007 | Fujimoto et al. ............. 359/656 |
| 7,268,953 | B2 | | 9/2007 | Matthae et al. |
| 7,486,445 | B2 | * | 2/2009 | Konishi et al. ............... 359/656 |
| 2003/0043473 | A1 | * | 3/2003 | Okuyama ..................... 359/659 |
| 2003/0165021 | A1 | | 9/2003 | Kawasaki |
| 2005/0207021 | A1 | * | 9/2005 | Yamaguchi ................... 359/658 |
| 2006/0082896 | A1 | * | 4/2006 | Mandai et al. ................ 359/661 |
| 2006/0203354 | A1 | * | 9/2006 | Fujimoto et al. ............. 359/660 |
| 2010/0182702 | A1 | * | 7/2010 | Watanabe et al. ............. 359/656 |
| 2011/0063735 | A1 | * | 3/2011 | Yamaguchi ................... 359/656 |

FOREIGN PATENT DOCUMENTS

DE    10 2005 051 025 A1    5/2007
WO    WO 02/067038 A1     8/2002

OTHER PUBLICATIONS

IPRP and Written Opinion for International Application No. PCT/EP2011/000931 dated Oct. 26, 2012.

* cited by examiner

*Primary Examiner* — Evelyn A. Lester
(74) *Attorney, Agent, or Firm* — Patterson Thuente Pedersen, P.A.

(57) ABSTRACT

A high-aperture immersion objective, in particular for confocal applications in fluorescence microscopy and for TIRF applications, having three subsystems of lenses and/or lens groups. The design of the subsystems has made it possible for a relatively large object field of 0.25 mm to be present in the case of a high-resolution numerical aperture of 1.49. Furthermore, improved transparency is possible up to a wavelength of 340 nm.

7 Claims, 1 Drawing Sheet

HIGH-APERTURE IMMERSION OBJECTIVE

PRIORITY CLAIM

The present application is a National Phase entry of PCT Application No. PCT/EP2011/000931, filed Feb. 25, 2010, which claims priority from German Application No 102010014502.5, filed Apr. 10, 2010, the disclosures of which are hereby incorporated by reference herein in their entirety.

FIELD OF THE INVENTION

The invention relates to a high-aperture immersion objective, in particular for confocal applications in fluorescence microscopy and for TIRF applications, which is composed of three subsystems comprising lenses and/or lens groups.

BACKGROUND

It is known that fluorescence illumination in TIRF microscopy is specifically designed such that a total reflection occurs at the cover glass. This only excites objects, which are located directly at the cover glass. Subjacent objects are not reached and can therefore not emit interfering background light. Therefore, TIRF microscopy also provides extremely high-contrast images. However, these images immediately lose their brilliance when a veiling glare occurs. In particular, a veiling glare also excites the object spheres, which are supposed to be suppressed. A veiling glare occurs wherever the excitation light is reflected through lens surfaces and lens and frame edges. The reflections of the lens surfaces can be effectively dealt with through high-quality coating. Reflections, which originate from the lens edges and the frame, can, to a great extent, not be avoided. It is merely possible to ensure that no light reaches said places in the first place. Therefore, the objective must be provided with an extremely high numerical aperture, so the excitation light passes as far away as possible from the lens edges and frames.

Since the excitation light is almost completely reflected at the cover glass, only a very small portion can be used for fluorescence. In order to nonetheless produce bright images, it is sensible to work with high magnifications, focusing the illumination on very small fields. However, this is not the case in confocal applications. Here, the resolution of the objective, irrespective of the aperture on the image side, can be exploited to the fullest. With these applications it is therefore sensible to work with objectives with high aperture and a smaller magnification because a small magnification is equivalent to a large object field and a bothersome objective change can therefore be foregone.

DE 10 2005 051 025 A1 describes a high-aperture, optical imaging system, particularly for microscopes, wherein an immersion objective comprising three optical partial systems with a magnification of less than or equal to 40× and a numerical aperture of greater than or equal to 1.0 and which is chromatically corrected up to the near infrared.

Such a solution is disadvantageous because the frequently desired numerical aperture of 1.4 is not reached.

SUMMARY OF THE INVENTION

The invention addresses the problem of further developing a semi-apochromatic micro-objective for normal oil immersions, in particular for TIRF microscopy applications, such that a relatively large object field of 0.25 mm is present in the case of a high-resolution numerical aperture of 1.49 and that an improved transparency also becomes possible up to a wavelength of 340 nm.

According to the invention, this problem is solved by a high-aperture immersion objective, adapted for confocal applications in fluorescence microscopy and for total internal reflection fluorescence (TIRF) applications, comprising:

three subsystems, each of the three subsystems comprising lenses and/or lens groups, the three subsystems including a first subsystem, a second subsystem and a third subsystem, wherein proceeding from the object side, the first subsystem comprises a double cemented element with a high positive refractive power and three following collecting lenses, including a first collecting lens, a second collecting lens and a third collecting lens, wherein the double cemented element has a plano surface facing the object side and wherein the first collecting lens is followed by a first meniscus lens bent toward the object side and having a negative refractive power, further wherein the second subsystem comprises a double cemented element with a low positive refractive power and a triple cemented element with a low positive refractive power, wherein the double cemented element comprises a fifth collecting lens and a first diverging lens and the triple cemented element has a second diverging lens encompassed by a sixth collecting lens and a seventh collecting lens, and further wherein the third subsystem comprises a second meniscus lens and a fifth meniscus lens with a low positive refractive power, which surround a triple cemented element with a very high negative refractive power, the triple cemented element including a third meniscus lens and a fourth meniscus lens and a third diverging lens.

Proceeding from the object side, the first subsystem comprises a double cemented element with a high positive refractive power and adjoining three collecting lenses, wherein the double cemented element has a plane surface facing the object side and is provided with a collecting lens, followed by a bent meniscus with negative refractive power. The double-cemented element itself has a strongly positive refractive power. The second subsystem comprises a double-cemented element with a low positive refractive power and a triple cemented element with a low positive refractive power. The third subsystem comprises two menisci with a low positive refractive power, which encompass a triple cemented element with a very high negative refractive power. The first of the two menisci has a refractive power, which is approximately 12 times lower than the refractive power of the objective.

Advantageously, the three collecting lenses of the first subsystem are made of Fluorkron glass, wherein the first collecting lens is made of a glass with a refractive index greater than 1.59 and the side facing away from the object side is a hyper-hemispherical surface.

It is furthermore advantageous when the double-cemented element of the second subsystem consists of a diverging lens made of a short flint glass and a collecting lens made of Fluorkron glass or calcium fluoride (CaF2).

It is also advantageous that the triple cemented element of the second subsystem consists of a diverging lens made of short flint glass, which is encompassed, by two collecting lenses made of Fluorkron glass or calcium fluoride (CaF2).

Expediently, at least one diverging lens of the third subsystem has an Abbe number smaller than 34.

The immersion objective, according to the invention, allows for describing a semi-apochromatic micro-objective for oil immersions with a numerical aperture of 1.49 and an object field of 0.25 mm. The objective has a sufficiently good transparency up to a wavelength of 340 nm.

BRIEF DESCRIPTION OF THE DRAWINGS

In the following, the invention shall be further explained using two embodiments.

DETAILED DESCRIPTION

Figure 1:
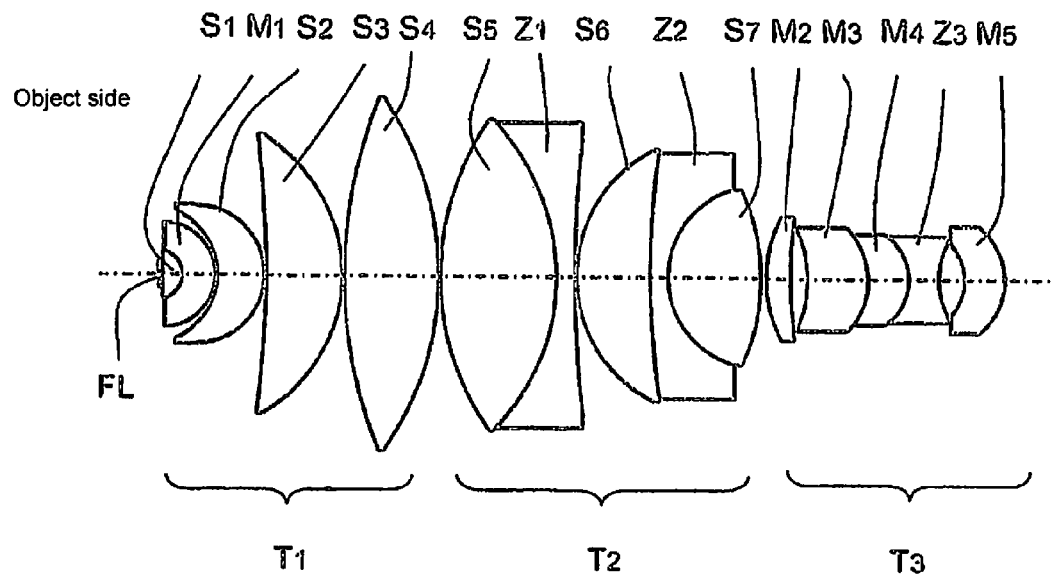
FIG. 1 shows the subsystems of the objective, according to the invention.

FIG. 1 shows the lens arrangement of the three optical subsystems seen from the side of the object, denoted with T1, T2, and T3. The subsystem T1 comprises a double-cemented element consisting of a collecting lens S1 having a plane surface FL facing the object side, and a meniscus M1 bent toward the object side with positive refractive power. Behind this double-cemented element are three collecting lenses S2, S3, and S4 made of Fluorkron glass.

The adjoining second subsystem T2 comprises a double-cemented element and a triple cemented element. The double-cemented element consists of a collecting lens S5 made of Fluorkron glass or calcium fluoride (CaF2) and a diverging lens Z1 made of short flint glass. The triple cemented lens comprises a diverging lens Z2 made of short flint glass, which is encompassed by two collecting lenses S6 and S7 made of Fluorkron glass or calcium fluoride (CaF2).

The third subsystem T3 has two menisci M2 and M5 with a low positive refractive power, which encompass a triple cemented element with very high negative refractive power consisting of two menisci M3 and M4 and a diverging lens Z3. The first of the two menisci M3 has a refractive power that is approximately 12 times lower than the refractive power of the objective.

Figure 2:
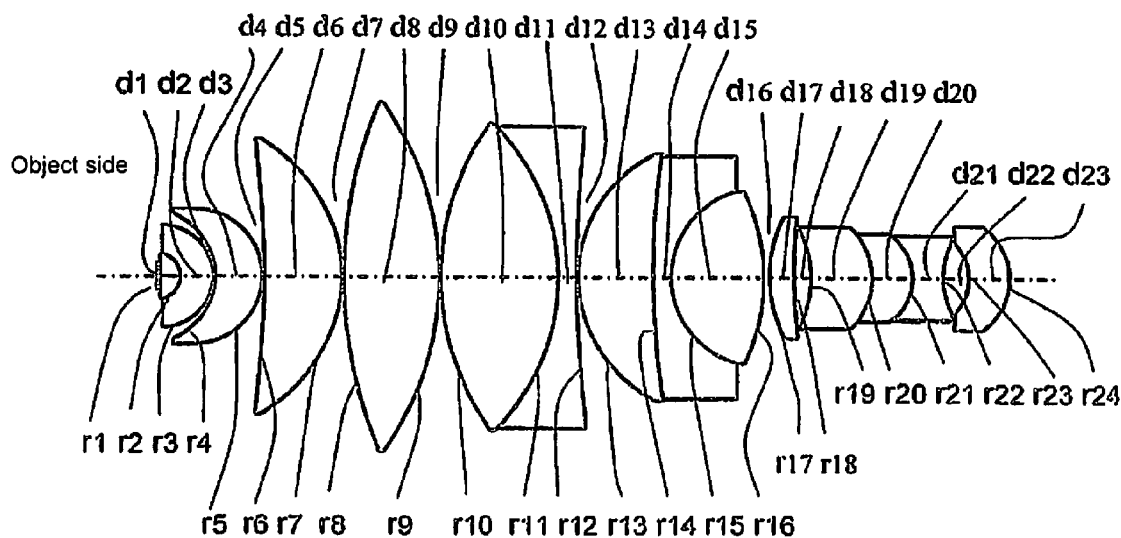
FIG. 2 shows the objective, according to the invention, with design data reference signs.

FIG. 2 shows the same lens arrangement specifying the individual radii of curvature r1 to r24 and thicknesses d1 to d23 with reference to the design data used in the following embodiments.

A magnification of 100, a numerical aperture of 1.49, a cover glass thickness of 0.17 mm, and a working distance of 0.12 mm result in the following design data for the first embodiment:

| Surface FL | Radius of curvature r | Thickness d | Refractive index $n_e$ Oil immersion | Abbe number $v_e$ |
|---|---|---|---|---|
| 1 | infinite | 1.000 | 1.525 | 59.2 |
| 2 | −1.413 | 1.900 | 1.888 | 40.5 |
| 3 | −3.026 | 0.100 | | |
| 4 | −4.038 | 2.700 | 1.594 | 68.0 |
| 5 | −4.004 | 0.100 | | |
| 6 | −62.194 | 4.300 | 1.440 | 94.5 |
| 7 | −9.567 | 0.100 | | |
| 8 | 28.800 | 5.240 | 1.440 | 94.5 |
| 9 | −18.700 | 0.100 | | |
| 10 | 15.962 | 6.700 | 1.440 | 94.5 |
| 11 | −13.143 | 1.090 | 1.617 | 44.3 |
| 12 | 70.769 | 0.100 | | |
| 13 | 8.1756 | 4.319 | 1.440 | 94.5 |
| 14 | 52.334 | 1.000 | 1.725 | 34.5 |
| 15 | 5.332 | 5.292 | 1.440 | 94.5 |
| 16 | −12.320 | 0.300 | | |
| 17 | 8.5343 | 1.365 | 1.594 | 68.0 |
| 18 | 29.639 | 0.992 | | |
| 19 | −6.451 | 3.487 | 1.723 | 29.3 |

-continued

| Surface FL | Radius of curvature r | Thickness d | Refractive index $n_e$ Oil immersion | Abbe number $v_e$ |
|---|---|---|---|---|
| 20 | −4.340 | 2.205 | 1.839 | 42.5 |
| 21 | −3.301 | 1.675 | 1.737 | 51.2 |
| 22 | 4.598 | 1.491 | | |
| 23 | −3.078 | 2.323 | 1.743 | 32.0 |
| 24 | −3.9243 | | | |

A magnification of 100, a numerical aperture of 1.49, a cover glass thickness of 0.17 mm, and a working distance of 0.11 mm result in the following design data for the second embodiment:

| Surface FL | Radius of curvature r | Thickness d | Refractive index $n_e$ Oil immersion | Abbe number $v_e$ |
|---|---|---|---|---|
| 1 | infinite | 1.024 | 1.525 | 59.2 |
| 2 | −1.402 | 1.220 | 1.888 | 40.5 |
| 3 | −2.548 | 0.100 | | |
| 4 | −3.924 | 2.750 | 1.635 | 63.5 |
| 5 | −3.704 | 0.216 | | |
| 6 | −110.60 | 5.000 | 1.440 | 94.5 |
| 7 | −9.858 | 0.100 | | |
| 8 | 39.809 | 5.540 | 1.440 | 94.5 |
| 9 | −18.303 | 0.100 | | |
| 10 | 20.834 | 7.000 | 1.440 | 94.5 |
| 11 | −12.230 | 1.100 | 1.617 | 44.3 |
| 12 | −44.344 | 0.100 | | |
| 13 | 8.913 | 5.400 | 1.440 | 94.5 |
| 14 | −30.506 | 0.900 | 1.725 | 34.5 |
| 15 | 5.870 | 6.670 | 1.440 | 94.5 |
| 16 | −10.146 | 0.219 | | |
| 17 | 7.802 | 1.800 | 1.594 | 68.0 |
| 18 | 19.670 | 1.150 | | |
| 19 | −4.433 | 1.080 | 1.725 | 34.5 |
| 20 | −21.287 | 1.800 | 1.839 | 42.5 |
| 21 | −2.820 | 0.700 | 1.737 | 51.2 |
| 22 | 4.279 | 1.600 | | |
| 23 | −2.820 | 2.401 | 1.762 | 27.4 |
| 24 | −3.704 | | | |

LIST OF REFERENCE SIGNS

T1, T2, T3 Subsystem
S1 to S7 Collecting lens
Z1, Z2, Z3 Diverging lens
M1, M2, M3, M4, M5 Meniscus
d1 to d23 Thickness
r1 to r24 Radius of curvature
FL Plane surface
$n_e$ Refractive index
$v_e$ Abbe number

The invention claimed is:

1. A high-aperture immersion objective, adapted for confocal applications in fluorescence microscopy and for total internal reflection fluorescence (TIRF) applications, comprising:
three subsystems, each of the three subsystems comprising lenses and/or lens groups, the three subsystems including a first subsystem, a second subsystem and a third subsystem, wherein proceeding from the object side,
the first subsystem comprises a double cemented element with a high positive refractive power and three following collecting lenses, including a first collecting lens, a second collecting lens and a third collecting lens, wherein the double cemented element has a plano surface facing the object side and wherein the first collecting lens is followed by a first meniscus lens bent toward the object side and having a negative refractive power, further wherein the second subsystem comprises a double cemented element with a low positive refractive power and a triple cemented element with a low positive refractive power, wherein the double cemented element comprises a fifth collecting lens and a first diverging lens and the triple cemented element has a second diverging lens encompassed by a sixth collecting lens and a seventh collecting lens, and further wherein the third subsystem comprises a second meniscus lens and a fifth meniscus lens with a low positive refractive power, which surround a triple cemented element with a very high negative refractive power, the triple cemented element including a third meniscus lens and a fourth meniscus lens and a third diverging lens.

2. The high-aperture immersion objective according to claim 1, wherein the second collecting lens, the third collecting lens and a fourth collecting lens of the first subsystem are made of Fluorkron glass, wherein the second collecting lens is made of a glass with a refractive index greater than 1.59 and a side of the second collecting lens facing away from the object side comprises a hyper-hemispherical surface.

3. The high-aperture immersion objective according to claim 1, wherein the fifth collecting lens of the double cemented element of the second subsystem is made of Fluorkron glass or CaF2 and the second diverging lens is made of short flint glass.

4. The high-aperture immersion objective according to claim 1, wherein the second diverging lens of the triple cemented element of the second subsystem is made of short flint glass, and further wherein the sixth collecting lens and the seventh collecting lens are each made of Fluorkron glass or calcium fluoride (CaF2).

5. The high-aperture immersion objective according to claim 1, wherein at least one of the third meniscus lens the fourth meniscus lens and/or the third diverging lens of the triple cemented element of the third subsystem has an Abbe number less than 29.5.

6. The high-aperture immersion objective according to claim 1, having the following design data with radii of curvature r being designated in mm, thicknesses d designated in mm, refractive indices $n_e$, Abbe numbers $v_e$, and the use of an oil immersion at a magnification of 100, a numerical aperture of 1.49, a cover glass thickness of 0.17 mm, and a working distance of 0.12 mm:

| SurfaceFL | Radius of curvature r | Thickness d | Refractive index $n_e$ Oil immersion | Abbe number $v_e$ |
|---|---|---|---|---|
| 1 | infinite | 1.000 | 1.525 | 59.2 |
| 2 | −1.413 | 1.900 | 1.888 | 40.5 |
| 3 | −3.026 | 0.100 | | |
| 4 | −4.038 | 2.700 | 1.594 | 68.0 |
| 5 | −4.004 | 0.100 | | |
| 6 | −62.194 | 4.300 | 1.440 | 94.5 |
| 7 | −9.567 | 0.100 | | |
| 8 | 28.800 | 5.240 | 1.440 | 94.5 |
| 9 | −18.700 | 0.100 | | |
| 10 | 15.962 | 6.700 | 1.440 | 94.5 |
| 11 | −13.143 | 1.090 | 1.617 | 44.3 |
| 12 | 70.796 | 0.100 | | |
| 13 | 8.1756 | 4.319 | 1.440 | 94.5 |
| 14 | 52.334 | 1.000 | 1.725 | 34.5 |
| 15 | 5.332 | 5.292 | 1.440 | 94.5 |
| 16 | −12.320 | 0.300 | | |
| 17 | 8.5343 | 1.365 | 1.594 | 68.0 |
| 18 | 29.639 | 0.992 | | |
| 19 | −6.451 | 3.487 | 1.723 | 29.3 |
| 20 | −4.340 | 2.205 | 1.839 | 42.5 |
| 21 | −3.301 | 1.675 | 1.737 | 51.2 |
| 22 | 4.598 | 1.491 | | |
| 23 | −3.078 | 2.323 | 1.743 | 32.0 |
| 24 | −3.9243 | | | |

7. The high-aperture immersion objective according to claim 1, having the following design data with radii of curvature r designated in mm, thicknesses d designated in mm, refractive indices $n_e$, Abbe numbers $v_e$, and the use of an oil immersion at a magnification of 100, a numerical aperture of 1.49, a cover glass thickness of 0.17 mm, and a working distance of 0.11 mm:

| Surface FL | Radius of curvature r | Thickness d | Refractive index $n_e$ Oil immersion | Abbe number $v_e$ |
|---|---|---|---|---|
| 1 | infinite | 1.024 | 1.525 | 59.2 |
| 2 | −1.402 | 1.220 | 1.888 | 40.5 |
| 3 | −2.548 | 0.100 | | |
| 4 | −3.924 | 2.750 | 1.635 | 63.5 |
| 5 | −3.704 | 0.216 | | |
| 6 | −110.60 | 5.000 | 1.440 | 94.5 |
| 7 | −9.858 | 0.100 | | |
| 8 | 39.809 | 5.540 | 1.440 | 94.5 |
| 9 | −18.303 | 0.100 | | |
| 10 | 20.834 | 7.000 | 1.440 | 94.5 |
| 11 | −12.230 | 1.100 | 1.617 | 44.3 |
| 12 | −44.344 | 0.100 | | |
| 13 | 8.913 | 5.400 | 1.440 | 94.5 |
| 14 | −30.506 | 0.900 | 1.725 | 34.5 |
| 15 | 5.870 | 6.670 | 1.440 | 94.5 |
| 16 | −10.146 | 0.219 | | |
| 17 | 7.802 | 1.800 | 1.594 | 68.0 |
| 18 | 19.670 | 1.150 | | |
| 19 | −4.433 | 1.080 | 1.725 | 34.5 |
| 20 | −21.287 | 1.800 | 1.839 | 42.5 |
| 21 | −2.820 | 0.700 | 1.737 | 51.2 |
| 22 | 4.279 | 1.600 | | |
| 23 | −2.820 | 2.401 | 1.762 | 27.4 |
| 24 | −3.704 | | | |

* * * * *